United States Patent
Le Nevé et al.

(10) Patent No.: US 9,265,279 B2
(45) Date of Patent: Feb. 23, 2016

(54) MOTORIZED CONVEYOR FOR MOVING A FLOW OF HARVEST FROM A FRUIT HARVESTING MACHINE

(75) Inventors: Daniel H. A. M. Le Nevé, Challans (FR); Vincent Rico, La Roche-sur-Yon (FR)

(73) Assignee: CNH Industrial France SAS (FR)

( * ) Notice: Subject to any disclaimer, the term of this patent is extended or adjusted under 35 U.S.C. 154(b) by 155 days.

(21) Appl. No.: 14/115,817

(22) PCT Filed: May 4, 2012

(86) PCT No.: PCT/EP2012/058318
§ 371 (c)(1),
(2), (4) Date: Nov. 5, 2013

(87) PCT Pub. No.: WO2012/150354
PCT Pub. Date: Nov. 8, 2012

(65) Prior Publication Data
US 2014/0144118 A1    May 29, 2014

(30) Foreign Application Priority Data
May 5, 2011    (FR) ...................... 11 53858

(51) Int. Cl.
*A23N 15/00*    (2006.01)
*A23N 15/02*    (2006.01)
*A01D 46/28*    (2006.01)
*B65G 13/04*    (2006.01)
*A01D 46/00*    (2006.01)

(52) U.S. Cl.
CPC ............... *A23N 15/02* (2013.01); *A01D 46/00* (2013.01); *A01D 46/285* (2013.01); *A23N 15/025* (2013.01); *B65G 13/04* (2013.01)

(58) Field of Classification Search
CPC ....... A01D 27/04; A01D 33/04; A01D 33/08; A01D 45/021; A01D 82/00; A01D 46/285; B07B 1/15; B07B 13/04; B07B 13/05; B07B 13/10; B07B 13/005; A23N 15/00; A23N 15/02; A23N 15/08; A23N 15/025
USPC ............... 56/14.3, 16.4 C, 327.1, 328.1, 330; 460/32, 114, 133, 140, 144; 99/546, 99/585, 635, 640, 637; 209/667
See application file for complete search history.

(56) References Cited

U.S. PATENT DOCUMENTS

| 2,927,616 | A | * | 3/1960 | Bruner ............................ 99/640 |
| 3,513,645 | A | * | 5/1970 | Garrett et al. ....................... 56/1 |
| 3,747,514 | A |   | 7/1973 | Ireland |
| 4,821,494 | A | * | 4/1989 | O'Halloran et al. ....... 56/16.4 C |
| 5,161,356 | A | * | 11/1992 | Pick ................................. 56/60 |
| 5,203,259 | A | * | 4/1993 | Miedema ....................... 99/640 |
| 6,499,283 | B1 | * | 12/2002 | Cook ........................ 56/16.4 B |

(Continued)

FOREIGN PATENT DOCUMENTS

WO    2010012936 A3    2/2010

*Primary Examiner* — Robert Pezzuto
(74) *Attorney, Agent, or Firm* — Patrick M. Sheldrake

(57) ABSTRACT

A motorized conveyor has a plurality of rollers spaced longitudinally, the rollers being driven in rotation to move the flow of harvest on the rollers in a longitudinal direction between upstream and downstream transverse axes, each roller having a surface of revolution comprising grooves that extend transversely and continuously over its entire length, so as to enable transverse routing of the flow of harvest while it is being conveyed.

20 Claims, 3 Drawing Sheets

(56) References Cited

U.S. PATENT DOCUMENTS

| | | | |
|---|---|---|---|
| 6,547,661 B1 * | 4/2003 | Ferrandez | 460/144 |
| 7,007,449 B2 * | 3/2006 | Kido et al. | 56/327.1 |
| 2009/0057208 A1 | 3/2009 | Pellenc et al. | |
| 2010/0096301 A1 | 4/2010 | Nyborg et al. | |

* cited by examiner

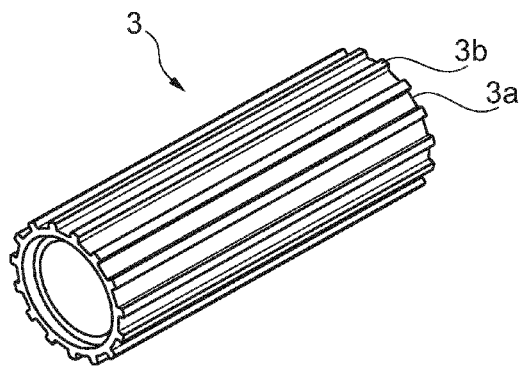
Fig. 1a
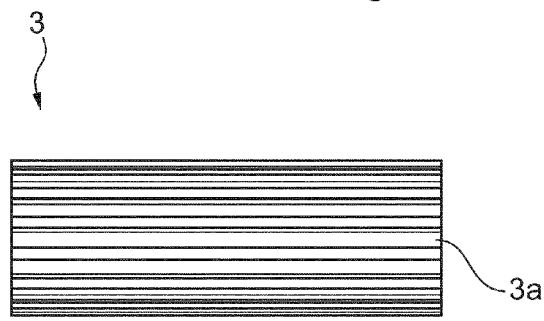
Fig. 1b
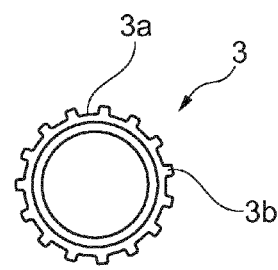
Fig. 1c
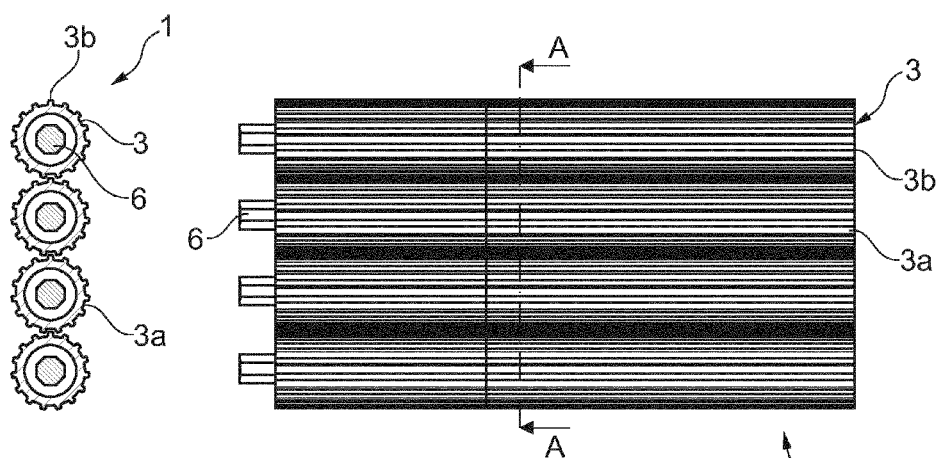
Fig. 2b
Fig. 2a

MOTORIZED CONVEYOR FOR MOVING A FLOW OF HARVEST FROM A FRUIT HARVESTING MACHINE

This application is the US National Stage filing of International Application Serial No. PCT/EP2012/058318 filed on May 4, 2012 which claims priority to French Application 1153858 filed May 5, 2011, each of which is incorporated herein by reference in its entirety.

FIELD OF THE INVENTION

The invention relates to a conveyor for moving a flow of harvest from a fruit harvesting machine, a sorting device comprising such a conveyor, a cleaning system comprising such a sorting device, and a fruit harvesting machine comprising such a sorting device or such a cleaning system.

The invention applies to the field of the mechanised harvesting of fruit growing on trees or bushes, such as grapes, berries, coffee beans, olives and other fruits notably growing in bunches.

BACKGROUND OF THE INVENTION

Such fruit is conventionally harvested by a shaker system that straddles a row of plants to detach the harvest. The flow of harvest obtained is then conveyed in the machine to be stored in at least one hopper provided for this purpose or in an ancillary trailer.

However, by virtue of the action of shaker system, the flow of harvest comprises, in addition to the detached fruit, notably juice, leaves, stalks, particles of wood, bunches of fruit of varied sizes.

To eliminate components other than fruit, in particular leaves and pieces of wood, harvesting machines comprise a cleaning system that is provided to eliminate said components from the flow by suction before storage.

Harvesting machines may also carry a sorting device that notably enables separation of the harvested flow as a function of the size of the components of said flow. Thus by providing for such sorting prior to cleaning, it is possible to expose to suction only the portion comprising components of large size, in particular to prevent the elimination by suction of detached fruit.

To this end, the sorting device may comprise a motorised conveyor for moving the flow of harvest and a system for separating the components of said flow of harvest that is fed by said conveyor.

In particular, as the search for quality in the field of vinification requires the maximum elimination of green residue, notably leaf stalks, contained in the flow of harvest, the sorting device may be operable to enable such elimination. The harvesting machine may further comprise a destemming device enabling separation of the fruit attached to the bunch stalks in the flow of harvest.

For optimum sorting of the flow of harvest, the separation system of the sorting device must be fed as homogeneously as possible by the conveyor and with the best distribution. However, prior art conveyors are unable to provide such a feed in a satisfactory manner.

SUMMARY OF THE INVENTION

The invention aims to improve on the prior art, notably by proposing a conveyor enabling significantly improved feeding of a system for separating a flow of harvest.

To this end, and according to a first aspect, the invention proposes a motorised conveyor for moving a flow of harvest from a fruit harvesting machine, said conveyor comprising a plurality of rollers spaced in the conveying direction, said rollers being driven in rotation to move the flow of harvest on said rollers in a longitudinal direction between upstream and downstream transverse axes, each roller having a surface of revolution comprising grooves that extend transversely to the conveying direction and continuously over its entire length.

According to a second aspect, the invention proposes a sorting device comprising such a conveyor and a system for separating the components of a flow of harvest, said system being disposed downstream of the conveyor to be fed with the flow of harvest by said conveyor.

According to a third aspect, the invention proposes a cleaning system for a flow of harvest comprising such a sorting device and a destemming device comprising a screen that is motorised in a longitudinal direction between an upstream transverse axis and a downstream transverse axis, said screen comprising openings adapted to allow the fruit to pass through, said destemming device further comprising means operable to interact with the flow of harvest disposed on a downstream portion of the screen in order to effect the separation of fruit attached to the bunch stalks, the conveyor of the sorting device being disposed adjacent an upstream portion of said screen and the machine further comprising a conveyor for feeding the flow of harvest onto said upstream portion.

According to a fourth aspect, the invention proposes a fruit harvesting machine comprising a motorised support structure and a harvesting assembly mounted on said structure, said harvesting assembly being operable to detach the harvest, said machine comprising such a sorting device or such a cleaning system that is fed with the flow of harvest coming from the harvesting assembly.

Other objects and advantages of the invention will become apparent in the course of the following description, given with reference to the appended figures, in which:

BRIEF DESCRIPTION OF THE DRAWINGS

FIG. 1a represents diagrammatically a roller of a conveyor according to an embodiment of the invention in perspective;

FIG. 1b represents diagrammatically a roller of a conveyor according to an embodiment of the invention from the front;

FIG. 1c represents diagrammatically a roller of a conveyor according to an embodiment of the invention from the side;

FIG. 2a represents the disposition in the conveyor of four rollers from FIGS. 1a, 1b and 1c from above;

FIG. 2b represents the disposition in the conveyor of four rollers from FIGS. 1a, 1b and 1c in section taken along the line A-A in FIG. 2a;

DETAILED DESCRIPTION OF PREFERRED EMBODIMENTS

Figure 3:
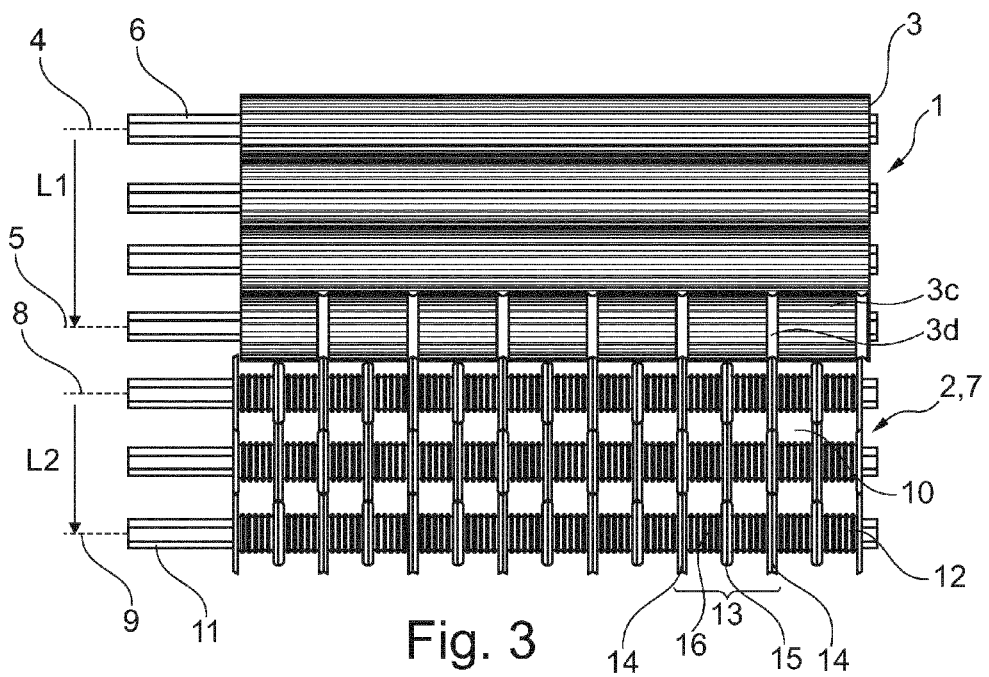
FIG. 3 represents diagrammatically as seen from above a sorting device comprising a conveyor and a separator system according to an embodiment of the invention.

The invention is applicable to a machine for harvesting fruit, in particular a harvester for the mechanised harvesting of grapes, notably with a view to their subsequent vinification. A harvester conventionally comprises a motorised support structure that is equipped with a driver station and a harvesting assembly mounted on said structure.

The harvester is designed to straddle at least one row of vines so that, as it moves, the vines are introduced successively into the harvesting assembly, which is operable to detach the harvest. To this end, the harvesting assembly comprises vine shakers, notably a row of shakers on each side of the space into which the vines are introduced.

The harvester also comprises a system for continuous recovery of the detached harvest, which comprises, in addition to the detached grapes, notably stalks, juice, leaves, pieces of wood, bunches of varied sizes. In one embodiment, the system comprises two bucket conveyors adapted to receive the detached harvest below the introduction space and to convey said harvest into the upper portion of the harvester.

In the context of vinification of grapes, it is desirable to eliminate the residue contained in the flow of harvest, notably green residue such as stalks, leaves, branches and pieces of wood. There is described hereinafter a sorting device for such operation that is intended to be mounted in the machine to be fed with the flow of harvest coming from the harvesting assembly.

The sorting device may be fed directly with the flow coming from the harvesting assembly. Alternatively, it may fed via a cleaning system and/or a destemming device enabling the separation of the fruit attached to the bunch stalks.

The sorting device comprises a motorised conveyor 1 for moving the flow of harvest coming from the harvesting machine and a system 2 for separating the components of said flow of harvest, said system being disposed downstream of the conveyor 1 to be fed with the flow of harvest by said conveyor.

Referring to the figures, the conveyor 1 comprises a plurality of rollers 3 spaced longitudinally, said rollers being driven in rotation to move the flow of harvest on said rollers in a longitudinal direction L1 between an upstream transverse axis 4 and a downstream transverse axis 5.

Given that they are brought into contact with the flow of harvest, the rollers 3 are preferably made from a corrosion-resistant material, in particular a stainless metal or a synthetic material. Moreover, the rollers 3 have a geometry of revolution which, when they rotate, causes longitudinal movement of the flow of harvest with limited mechanical loads exerted on the fruit.

Each roller 3 is fixedly mounted on a bar 6 driven in rotation, said roller including a bore the geometry of which is complementary to that of said bar in order to assure the circumferential fixing of said roller to said bar. Referring to FIGS. 2a and 2b, the bars 6 have a polygonal section and each of the rollers 3 includes a bore of complementary section. Alternatively, the bars 6 and the bores in the rollers 3 may have a different geometry.

For optimum sorting of the flow of harvest, the separator system 2 must be fed as homogeneously as possible by the conveyor 1 and with the best possible distribution. To this end, each of the rollers 3 has a surface of revolution comprising grooves 3a that extend transversely and continuously over its entire length.

In the embodiment shown, each of the rollers 3 includes a plurality of grooves 3a, each of which has a U-shaped section and which are separated in the circumferential direction by axial ribs 3b, each of said ribs extending transversely and continuously over the entire length of said roller and having an inverted U-shaped section.

Such a circumferential distribution of the grooves 3a and the ribs 3b enables longitudinal movement in the direction L1 of the flow of harvest and transverse migration of said flow of harvest while it is being conveyed, which significantly improves the distribution of said flow over the width of said conveyor. The berries roll, while the other components of the flow are able to slide in a transverse direction. Thus, the conveyor 1 feeds the separator system 2 with a homogeneous flow of harvest having a limited thickness, which enables improvement of the quality of the sorting effected by said separator system. The system also prepares the flow for more efficient cleaning by suction. The shape and the arrangement of the grooves 3a and the ribs 3b prevent damage to the transferred product.

In particular, the conveyor 1 is conventionally fed with the flow of harvest by forming on the rollers 3 a swath having a plurality of layers and a limited transverse dimension. The rollers 3 enable longitudinal conveyance of the base of the swath and transverse distribution of said swath so as to obtain, after only a few rollers 3, a spreading of the flow of harvest in substantially a single layer. The transferred product, composed mainly of fruit, is caused to rotate. The superposition of these moving spherical articles is not possible, which causes spreading of the swaths. Moreover, the grooves 3a enable evacuation of juice and small residue such as pips and pulp, so as to assure pre-sorting of the flow of harvest. Use of a small clearance between two adjacent rollers prevents the accumulation of debris, pips, pulp, etc. around the roller 3, which makes it self-cleaning.

The separator system 2 may be adapted to enable elimination of green residue, notably leaf stalks, from the flow of harvest. Referring to FIG. 3, the separator system 2 comprises a motorised discontinuous conveyor surface 7 for moving the flow of harvest on said conveyor surface in a longitudinal direction L2 between an upstream transverse axis 8 and a downstream transverse axis 9. In particular, the directions L1 and L2 may lie in the same horizontal plane. The conveyor surface 7 includes vertical openings 10 the geometry of which is adapted to enable fruit from said flow of harvest to pass through them and to retain elements of larger size on said conveyor surface.

Accordingly, the discontinuous conveyor surface 7 enables larger bodies of any kind, such as leaf stalks and small bunch stalks in the flow of harvest to remain flat, whilst removing the fruit through it by gravity. In a plane, the dimension of the stalks, i.e. their length, is very much greater than that of the fruit, i.e. its diameter. It is therefore possible to separate these components by virtue of the size difference via openings 10 of appropriate geometry that extend vertically.

Furthermore, the discontinuous conveyor surface 7 and/or the conveyor 1 may be equipped with a device for cleaning the flow of harvest by suction to eliminate other residue of greater size, notably leaves, branches, and particles of wood. In particular, the cleaning device may be disposed downstream of the conveyor 1 and/or upstream of the discontinuous conveyor surface 7 to effect the suction when the flow of harvest is distributed on said conveyor and before the separation of the stalks begins, which enables said conveyor surface to be fed with a previously cleaned flow of harvest and thus facilitates said separation.

In FIG. 3, the discontinuous conveyor surface 7 comprises a plurality of bars 11 spaced longitudinally and driven in rotation, each of said bars comprising a separator roller 12 that includes a transverse succession of patterns 13. Each of the patterns 13 comprises a first large disk 14 of large diameter, a small disk 15 of small diameter, and a second large disk 14, two consecutive disks 14, 15 being separated by a sleeve 16, the diameter of which is less than that of the small disk 15.

Figures 4A, 4B:
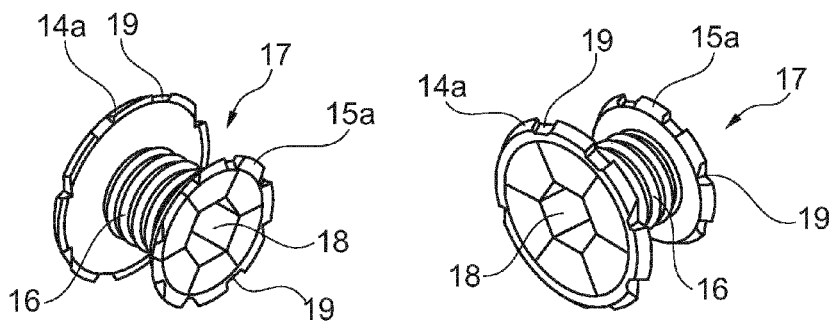
FIGS. 4a and 4b represents diagrammatically the module forming the separator rollers of the sorting device from FIG. 3, in perspective.

To this end, in the embodiment shown, each bar 11 comprises a succession of identical modules 17 that are mounted on said bar to form a roller 12. Referring to FIGS. 4a, ab and 4c, each module 17 comprises a large half-disk 14a and a small half-disk 15a separated by the sleeve 16. Thus a pattern 13 on the roller 12 is formed by two adjacent modules 17 mounted the opposite way round.

Figures 4C, 4D, 4E:
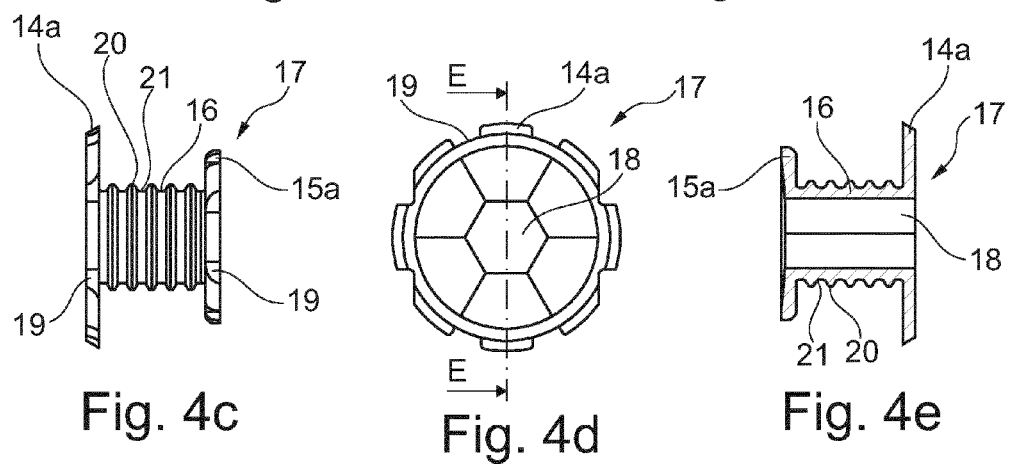
FIG. 4c represents diagrammatically the module forming the separator rollers of the sorting device from FIG. 3, from the front.
FIG. 4d represents diagrammatically the module forming the separator rollers of the sorting device from FIG. 3, from the side.
FIG. 4e represents diagrammatically the module forming the separator rollers of the sorting device from FIG. 3, in section taken along the line E-E in FIG. 4d.

Moreover, each module 17 comprises a bore 18 of complementary geometry to that of the bar 11 in order to ensure the circumferential fixing of said module to said bar. In FIGS. 4a, 4b and 4c, the module 17 shown comprises a bore 18 of polygonal, in particular hexagonal, geometry.

Referring to FIG. 3, two adjacent separator rollers 12 are disposed so that each small disk 15 of one of said rollers is aligned with a large disk 14 of the other roller 12, notably with a small clearance between said disks to prevent stalks falling through said gap.

Moreover, to limit the clearance further, the disks 14, 15 of the same diameter may have a peripheral surface the geometry of which is concave, while the disks 14, 15 of the other diameter may have a peripheral surface the geometry of which is convex and which faces the concave geometry. In particular, the convex geometry may be disposed inside the concave geometry. In the embodiment shown, the large disks 14—respectively the small disks 15—have a peripheral surface of concave geometry—respectively of convex geometry.

Thus each opening 10 is formed between two longitudinally consecutive modules 17 and delimited longitudinally by the peripheral surfaces of their sleeves 16 and transversely by their half-disks 14a, 15a. In particular, the size of an opening 10 may be adjusted longitudinally by varying the longitudinal spacing between the corresponding two rollers 12 and/or transversely by compressing the corresponding two adjacent modules 17.

The longitudinal alignment of the disks 14, 15 and their alternating transverse and longitudinal disposition enable the generation of a sinuous path in the longitudinal direction L2 of the separator system 2, such that the stalks are arranged crossways to move them on the rollers 12 in said longitudinal direction. This prevents the stalks from being directed toward an opening 10 and thus dropping through said opening.

The peripheral surfaces of the disks 14, 15 each have circumferentially spaced transverse notches 19. Thus the leaf stalks may be entrained by the notch 19 of a disk 14, 15 to facilitate their longitudinal disposition on the separator rollers 12.

In FIGS. 3, 4a, 4b, 4c, 4d and 4e, the sleeves 16 have a peripheral surface provided with ribs 20 separated transversely by grooves 21, said grooves and ribs possibly extending circumferentially over the entire periphery of the sleeve 16. In particular, the grooves 21 are adapted to favour longitudinal conveyance of the stalks, for example by having a width of the same order as that of the stalks, notably in the range 2 mm to 3.5 mm. Furthermore, the ribs 20 may be coated with a sticky material to favour attachment of the stalks.

Several configurations of the rollers 12 may be envisaged. For example, the diameter of the sleeve 16 may vary in order to enlarge or reduce the openings 10. In one embodiment, the sleeve 16 may receive an envelope element covering its circumference. The thickness of this element then enables adjustment of the dimensions of the openings 10 between two rollers 12 and adjustment of the passages according to the sorted fruit.

To reduce the distance between the conveyor 1 and the separator system 2, and thus the risk of components of the flow of harvest dropping through said gap, the conveyor 1 comprises a downstream roller 3c that has annular notches 3d, each facing a large disk 14 of the upstream separator roller 12. In particular, the disks 14 of the upstream roller 12 may be disposed in respective notches 3d.

In one embodiment, the sorting device comprises a frame on which the conveyor 1 and the separator system 2 are mounted, said frame also enabling mounting of said device in the harvesting machine. Furthermore, the sorting device may comprise a motorisation system mounted on the frame and operable to drive simultaneously in rotation the respective rollers 3, 12 of the conveyor 1 and the separator system 2.

Figure 5A:
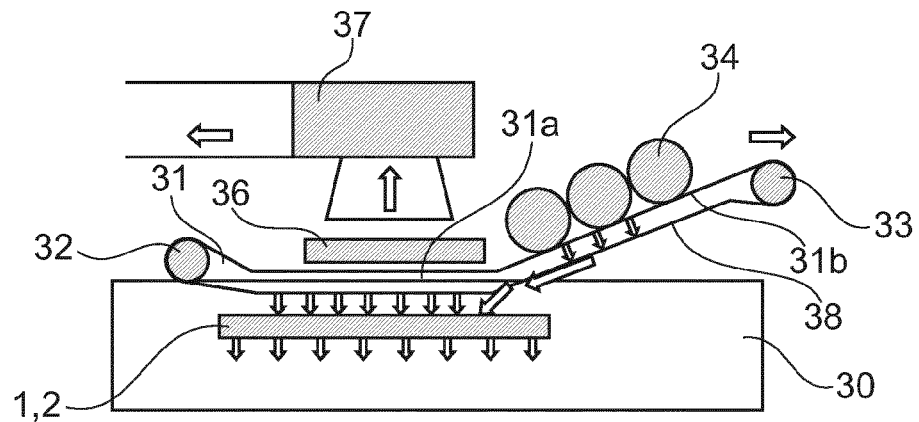
FIG. 5a represents diagrammatically the disposition of a sorting device and a destemming device above a hopper of a harvesting machine from the side.
Figure 5B:
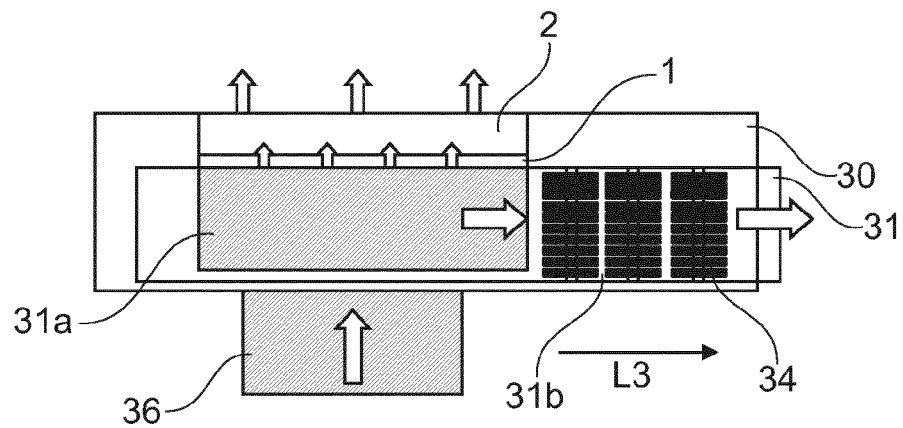
FIG. 5b represents diagrammatically the disposition of a sorting device and a destemming device above a hopper of a harvesting machine from above.
Figure 5C:
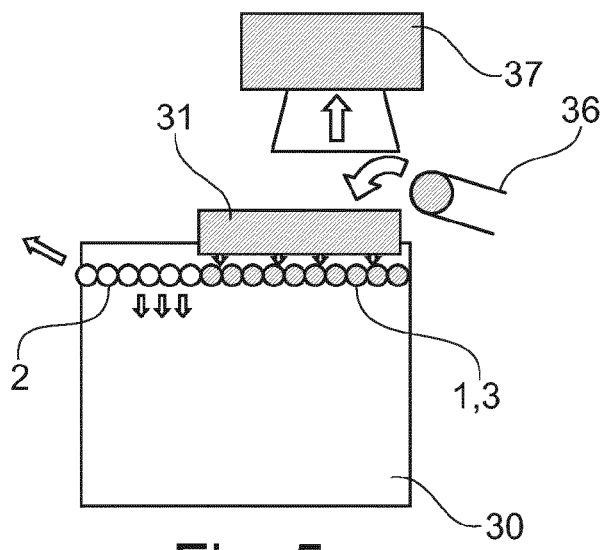
FIG. 5c represents diagrammatically the disposition of a sorting device and a destemming device above a hopper of a harvesting machine from the front.

Referring to FIGS. 5a, 5b and 5c, there is described a harvesting machine comprising a hopper 30 above which is disposed a cleaning system comprising the sorting device and a destemming device. In particular, the machine may comprise two hoppers 30 equipped in this way. Alternatively, the machine may be equipped with a sorting device only or the cleaning system may be used independently of the machine, for example in a cellar.

The destemming device comprises a screen 31 that is driven in a longitudinal direction L3 between an upstream transverse axis 32 and a downstream transverse axis 33. The screen 31 comprises openings adapted to enable fruit to pass through and means operable to interact with the flow of harvest disposed on the screen 31 in order to bring about separation of the fruit attached to the bunch stalks.

In an embodiment known from the document EP-1 002 467, for example, to enable separation of the fruit from the bunch stalks by an ejection effect, the destemming device comprises a motorised rotary member surmounting an endless screen. The member comprises radial destemming fingers adapted, when rotating, to interact with the flow disposed on the screen in order to bring about the separation of fruit attached to the bunch stalks, which fruit may then pass through the screen while the rest of the flow remains on said screen.

The screen 31 in FIGS. 5a, 5b, and 5c has an upstream portion 31a and a downstream portion 31b, the rotary members 34 being disposed only above said downstream portion to effect the destemming. The machine also comprises a conveyor 36 for feeding the flow of harvest onto the upstream portion 31a.

In particular, the flow of harvest coming from the harvesting assembly is fed onto the upstream portion 31a of the screen 31, notably the fruit from said flow passing through said upstream portion, and the remainder of the harvest is conveyed toward the downstream portion 31b to be destemmed. Moreover, beyond the downstream transverse axis 33, the residue disposed on the screen 31 is ejected outside the hopper 30.

Moreover, the machine comprises a device 37 for cleaning by suction the flow of harvest supplied to the upstream portion 31a of the screen 31, said device being disposed above the conveyor 36, notably to suck up leaves, branches and pieces of wood from said flow.

The conveyor 1 of the sorting device is disposed below the upstream portion 31a of the screen 31 so as to be fed with the flow of harvest passing through said upstream portion, said flow then being conveyed toward the separator system 2, notably to eliminate stalks that may have been able to pass through the upstream portion 31a of the screen 31.

In particular, the openings 10 of the separator system 2 are disposed above the hopper 30 to enable its direct filling with the grapes, the downstream separator roller 12 being disposed so as to enable ejection of residue outside said hopper.

In the embodiment shown, the longitudinal direction L1 of the conveyor 1 is perpendicular to the longitudinal direction L3 of the screen 31. Moreover, the hopper 30 comprises a top opening having a longitudinal dimension that is greater than its transverse dimension, said longitudinal dimension being that in the direction of forward movement of the machine and in the longitudinal direction L3 of the screen 31.

To improve sorting further, the destemming device further comprises means for feeding the conveyor 1 of the sorting device with the destemmed flow of harvest. Thus even the destemmed flow is sorted before it is stored, notably to eliminate stalks that may have been able to pass over the screen 31 during destemming.

In one embodiment, the feed means comprise a deflector 38 disposed under the downstream portion 31b of the screen 31, said deflector forming a feed path of the conveyor 1 of the sorting device. In particular, the downstream portion 31b and the deflector 38 are inclined to enable the conveyor 1 to be fed by gravity.

In another embodiment of the invention, not show in the Figures, the destemming device is shortened by arranging the upstream axis 32 at a position upstream of the conveyor 36. A sorting device is provided in the space freed by the shortened upstream portion 31a of the screen. The sorting device is arranged below the outlet of the conveyor 36 and below the hood of the cleaning device 37 and is operable to convey the harvest to the destemming device. The outlet of the separator system 3 of the sorting system is aligned with the new upstream portion of the screen 31 of the destemming device.

In use, the conveyor 36 supplies the harvest to the rollers 3 of the conveyor 1, which spread out the berries and other material and convey them to the separator rollers 12. Loose berries and juice are permitted to fall through the openings 10 of the separator system 2 and the other harvest material is fed towards the destemming device. The last separator roller 12, which is disposed adjacent the shorter moving screen 31, transfers the bunches, stalks, wood particles and other material onto this screen, which guides them to the rotary members 34 for removal of the berries from the stems. The loosened berries migrate through the upper and lower runs of the screen 31 and the deflector 38 guides them back to the hopper 30. The stalks and other residue are ejected from the machine at the downstream axis 33.

The cleaning device 37 extracts lighter and greater surface portions such as leaves from the harvest while they fall from the conveyor 36 to the sorting device and are conveyed along the sorting device: the rollers shake the material and dislodge any material that might hold the leaves down. This extraction further is enhanced while the material passes below the hood and over the openings 10, which allow for a substantial upward air flow.

The invention claimed is:

1. A motorized conveyor for moving a flow of harvest from a fruit harvesting machine, said conveyor comprising
a plurality of rollers spaced in a conveying direction, said rollers configured for being driven in rotation to move the flow of harvest on said rollers in a longitudinal direction between upstream and downstream transverse axes, wherein each roller has a surface of revolution comprising grooves that extend transversely to the conveying direction and continuously over an entire length of the surface of revolution, so as to enable transverse migration of said flow of harvest while it is conveyed.

2. A motorized conveyor according to claim 1, wherein the grooves each have a U-shaped section.

3. A motorized conveyor according to claim 2, wherein said rollers each have a plurality of grooves separated circumferentially by axial ribs, each of said ribs extending transversely and continuously over the entire length of said roller and having an inverted U-shaped section.

4. A motorized conveyor according to claim 1, wherein each roller is fixedly mounted on a bar driven in rotation, said roller including a bore the geometry of which is complementary to that of said bar and circumferential fixing said roller to said bar.

5. A sorting device comprising
a motorized conveyor for moving a flow of harvest from a fruit harvesting machine, said conveyor comprising a plurality of rollers spaced in a conveying direction, said rollers configured for being driven in rotation to move the flow of harvest on said rollers in a longitudinal direction between upstream and downstream transverse axes and wherein each roller has a surface of revolution comprising grooves that extend transversely to the conveying direction and continuously over an entire length of the surface of revolution, so as to enable transverse migration of said flow of harvest while it is conveyed; and
a separator system for separating the components of a flow of harvest, said system being disposed downstream of the conveyor to be fed with the flow of harvest by said conveyor.

6. A sorting device according to claim 5, further comprising a motorized discontinuous conveyor surface for moving the flow of harvest on said conveyor surface in a longitudinal direction between the upstream transverse axis and the downstream transverse axis, said conveyor surface including vertical openings the geometry of which is adapted to enable fruit from said flow of harvest to pass through the vertical openings and to retain elements of larger size on said conveyor surface.

7. A sorting device according to claim 6, wherein the discontinuous conveyor surface comprises a plurality of bars spaced longitudinally and driven in rotation, each of said bars comprising a separator roller that includes a transverse succession of patterns, each of the patterns comprising a first large disk of large diameter, a small disk of small diameter, and a second large disk, two consecutive disks separated by a sleeve and the diameter of the sleeve is less than the diameter of the small disk.

8. A sorting device according to claim 7, wherein each bar comprises a succession of identical modules that are mounted on said bar to form the separator roller, each module comprising a large half-disk and a small half-disk separated by the sleeve, and a pattern on the separator roller being formed by two adjacent modules mounted opposing one another.

9. A sorting device according to claim 7, wherein two respective separator rollers of two adjacent bars of the plurality of bars are disposed so that the small disk of one of the two respective separator rollers is aligned with the first or the second large disk of another of the two respective separator rollers.

10. A sorting device according to claim 9, wherein the first and the second large disks have a peripheral surface including a concave geometry, the small disk having a peripheral surface having a convex geometry facing the concave geometry.

11. A sorting device according to claim 7, wherein the peripheral surfaces of the first and second large disks and of the small disk disks have circumferentially spaced transverse notches.

12. A sorting device according to claim 7, wherein the sleeves have a peripheral surface provided with ribs transversely separated by grooves.

13. A sorting device according to claim 7, wherein-the conveyor comprises a downstream roller which includes annular notches which are disposed facing the first or second large disk of an upstream separator roller.

14. A cleaning system for a flow of harvest, comprising
a sorting device comprising a motorized conveyor for moving a flow of harvest from a fruit harvesting machine and a separator system;
said conveyor comprising a plurality of rollers spaced in a conveying direction, said rollers configured for being driven in rotation to move the flow of harvest on said rollers in a longitudinal direction between upstream and downstream transverse axes and wherein each roller has a surface of revolution comprising grooves that extend transversely to the conveying direction and continuously over an entire length of the surface of revolution, so as to enable transverse migration of said flow of harvest while it is conveyed;
said separator system for separating the components of a flow of harvest, disposed downstream of the conveyor to be fed with the flow of harvest by said conveyor; and
a destemming device comprising a screen that is motorized in a longitudinal direction between the upstream transverse axis and the downstream transverse axis, said screen comprising openings adapted to allow the fruit to pass through, said destemming device further comprising a separator to interact with the flow of harvest disposed on a downstream portion of the screen and separate-fruit attached to the bunch stalks, the conveyor disposed adjacent an upstream portion of said screen and the machine further comprising a conveyor for feeding the flow of harvest onto said upstream portion.

15. A cleaning system according to claim 14, wherein the conveyor of the sorting device is disposed below the upstream portion of the screen and the destemming device further comprises means for feeding the conveyor of the sorting device with the destemmed flow of harvest.

16. A cleaning system according to claim 15, wherein the feeder comprises a deflector disposed under the downstream portion of the screen, said deflector forming a feed path of the conveyor of the sorting device.

17. A cleaning system according to claim 14 further comprising a device for cleaning by suction the flow of harvest feeding the upstream portion of the screen.

18. A cleaning system according to claim 14, wherein the longitudinal direction of the conveyor of the sorting device is perpendicular to the longitudinal direction of the screen.

19. A cleaning system according to claim 14, in combination with a fruit harvesting machine-and further comprising a motorized support structure and a harvesting assembly mounted on said structure, said harvesting assembly being operable to detach the harvest.

20. A cleaning system according to claim 19, further comprising a hopper above which the sorting device and the destemming device are disposed.

* * * * *